United States Patent
Gavillero Martín et al.

(10) Patent No.: US 7,423,959 B2
(45) Date of Patent: Sep. 9, 2008

(54) PROCESS FOR SYNCHRONIZATION IN THE DOWNSTREAM OF MULTIPLE USERS IN A POINT MULTIPOINT SYSTEM WITH OFDM MODULATION

(75) Inventors: Juan Miguel Gavillero Martín, Burjasot (ES); Juan Carlos Riveiro Insua, Valencia (ES); Salvador Iranzo Molinero, Valencia (ES); Nils Hakan Fouren, Barcelona (ES); Francisco Javier Jimenez Marquina, Valencia (ES); Jorge Vicente Blasco Claret, Valencia (ES)

(73) Assignee: Di Seno de Sistemas en Silicio SA, Paterna (Valencia) (ES)

( * ) Notice: Subject to any disclaimer, the term of this patent is extended or adjusted under 35 U.S.C. 154(b) by 772 days.

(21) Appl. No.: 10/718,143

(22) Filed: Nov. 20, 2003

(65) Prior Publication Data
US 2004/0114551 A1  Jun. 17, 2004

Related U.S. Application Data

(63) Continuation of application No. PCT/ES02/00234, filed on May 17, 2002.

(30) Foreign Application Priority Data

May 21, 2001  (ES)  ................................ 200201154

(51) Int. Cl.
*H04J 11/00* (2006.01)

(52) U.S. Cl. .................. 370/208; 370/503; 375/260

(58) Field of Classification Search ................ 370/203, 370/208, 503–516; 375/354, 355, 260
See application file for complete search history.

(56) References Cited

U.S. PATENT DOCUMENTS

| | | | | |
|---|---|---|---|---|
| 5,732,113 | A * | 3/1998 | Schmidl et al. | 375/355 |
| 6,519,291 | B1 | 2/2003 | Dagdeviren et al. | |
| 6,628,735 | B1 * | 9/2003 | Belotserkovsky et al. | 375/355 |
| 6,647,025 | B1 | 11/2003 | Sudo | |
| 6,876,675 | B1 * | 4/2005 | Jones et al. | 370/509 |
| 6,985,432 | B1 * | 1/2006 | Hadad | 370/203 |

FOREIGN PATENT DOCUMENTS

| | | |
|---|---|---|
| EP | 0798903 | 10/1997 |
| WO | WO 00/77961 | 12/2000 |
| WO | WO 01/28146 | 4/2001 |

* cited by examiner

*Primary Examiner*—Ricky Ngo
*Assistant Examiner*—Pao Sinkantarakorn
(74) *Attorney, Agent, or Firm*—Klauber & Jackson (57) ABSTRACT

The system in this invention is applicable to bi-directional communication over the electricity network between a head-end and a plurality of users, and permits the synchronization in time and frequency of multiple users in a multi-carrier OFDM communication system. It is characterized in that it consists of the generation of synchronization sequences by means of two identical synchronization symbols, periodically transmitted in the downstream, from the head-end to the users to estimate and correct the sampling frequency and simultaneously estimate the moment in which each OFDM symbol commences.

11 Claims, 7 Drawing Sheets

FIG. 8

PROCESS FOR SYNCHRONIZATION IN THE DOWNSTREAM OF MULTIPLE USERS IN A POINT MULTIPOINT SYSTEM WITH OFDM MODULATION

RELATED APPLICATIONS

The present application is a Continuation of co-pending PCT Application No. PCT/ES02/00234, filed May 17, 2002, which in turn, claims priority from Spanish Application Serial No. 200101154, filed May 21, 2001. Applicants claim the benefits of 35 U.S.C. §120 as to the PCT application and priority under 35 U.S.C. §119 as to said Spanish application, and the entire disclosures of both applications are incorporated herein by reference in their entireties.

TECHNICAL FIELD OF THE INVENTION

The present invention pertains to the telecommunications sector and in particular it is applicable to two-way communication between a head-end and various users so as to carry out synchronization in the downstream channel, that is the link between the head-end and the users, where the electricity network is used as the means of transmission to offer multiple services to the users.

OBJECTIVE OF THE INVENTION

The objective of the present invention is to provide a new, highly secure, time and frequency synchronization process for the downstream channel in the electricity network which avoids inherent problems, typically due to high noise levels and selectivity in frequency that are present during the transmission of data over the electricity network and thereby avoids the production of false indications of synchronization in the downstream channel.

By means of the process in this invention the various user receivers synchronize at the frequency used by the head-end transmitter, starting from the signal received in the downstream channel. Furthermore, by means of the process described herein, and following the sample of a received signal, each user receiver knows which sample among all of the samples received belongs to the same signal, that is, each user receiver knows the beginning of each symbol.

The invention has been specifically conceived to undertake synchronization of various users in the system specified in the Spanish patent submission No. 20003024 concerning "a system and process for digital transmission of data, point to multipoint, over the electricity network".

BACKGROUND ART

Various synchronization methods for OFDM signals are known in the prior art, but none of these reaches the levels of high security needed to avoid false indications of synchronization in point to multipoint systems where the means of transmission is the electricity network.

It is well known that the electricity network is a difficult transmission medium due to the fact that the connection and disconnection of different apparatus on the network produces voltage peaks and impedance variation on the line, so that channel response varies over time.

Among the synchronization methods known, one must emphasize the method described in U.S. Pat. No. 5,732,113, concerning a time synchronization process using one synchronization symbol in two equal halves, where, to carry out the synchronization a lesser number of samples is used than the number proposed by the present invention, and where impulse noise, which is very common in the electricity network, affects the synchronization to a much greater degree due to the fact that by definition these are occasional noises affecting a small number of samples, so they will affect this process more than the solution proposed in the present invention, and therefore, the method of using only one synchronization symbol is not desirable in a transmission system using the electricity network.

One must also indicate that the use of one synchronization symbol means greater variance in the calculation or estimation of the synchronization due to the use of a smaller number of samples to carry out the synchronization.

P. Moose published the concept of using two equal symbols in: "A technique for orthogonal frequency division multiplexing frequency offset correction. IEEE Trans. on Comm., vol. 42, pp2908-2914, October 1994", but these symbols have never been considered or used to carry out time synchronization, as occurs in the present invention, instead, Moose used these to estimate errors in the frequency of analog translation.

Finally, carrying out frequency synchronization by means of the arctangent of the correlation to correct errors in the frequency of analog translation is known in the prior art, for example in U.S. Pat. No. 5,732,113 or in the article by Moose. To carry out frequency synchronization in the current invention involves estimating the sampling frequency error in the analog/digital converters in each one of the user receivers, which is substantially different from what is known in the prior art.

DESCRIPTION OF THE INVENTION

To carry out frequency and time synchronization in the downstream channel for multiple users in a point to multipoint transmission system with OFDM modulation using the electricity network as the transmission means, the current invention comprises the sending of synchronization sequences inserted with the information that is sent via the downstream channel, that is the channel which runs from the head-end to the users, and is characterized because the process comprises the generation of synchronization sequences by means of two identical synchronization symbols transmitted periodically in the downstream channel by the head-end equipment, to all the user equipment and these in turn then detect said synchronization sequences in reception and estimate and correct the sampling frequency in the analog/digital converters included in the receivers in the user equipments, or carry out a re-sampling of the digital signal (synchronization in frequency) and simultaneously estimate the moment each OFDM symbol begins (synchronization in time).

According to the current invention, the detection of the synchronization sequences occurs by maximizing the maximum likelihood criteria which is known in the prior art, but with the novelty that time synchronization begins from the calculation of the maximum correlation of the samples of two symbols of the received sequences, where this maximum is the mid point in the flat zone for the correlation peak, whose size in number of samples is equal to the number of samples of the cyclic prefix without intersymbol interference (ISI), and frequency synchronization is carried out by means of calculating the angle of this correlation in the moment determined as maximum correlation.

The correlation maximum is calculated by detecting the correlation peaks that surpass a previously defined threshold for the power of the received signal where the value of this maximum is taken to be the mid point of the flat zone in the correlation peak whose size in number of samples is equal to the number of samples of the cyclic prefix without intersymbol interference (ISI), where the cyclic prefix is a prefix that is usually added to avoid inter-symbol interference; where the value of said threshold is fixed to minimize the probability of synchronization acquisition due to false alarms (normally due to impulse noise that affects the electricity network), and the correlation γ(m) is calculated by means of the following algorithm:

$$\gamma(m) = \sum_{k=m}^{m+l+1} r(k) r*(k+n)$$

where m refers to the moment of calculation of the correlation, r(k) the sample received in the moment k, r*(k+n) the complex conjugation of the received sample in the moment k+n, 1=N and n=N+L, where N is the number of samples of one of the symbols in the synchronization sequence and L the number of samples of the cyclic prefix in the OFDM symbol. This correlation algorithm is the mathematical correlation of two intervals of N samples separated by N+L samples of the received signal.

The power is calculated by means of the following algorithm:

$$\xi(m) = \frac{1}{2} \sum_{k=m}^{m+l-1} (|r(k)|_2 + |r(k+n)|_2) \cong \sum_{k=m}^{m+l-1} |r(k)|_2$$

that is, power can be calculated as the squared module of the samples received in the modem.

The process in this invention includes the iterative calculation of correlation and power. In this case the correlation calculated iteratively is referred to as P(d) and power calculated iteratively is referred to as R(d), where d refers to the moment of calculation of the correlation. In this case, the samples received are stored in the receiver and furthermore, the partial products are also stored, the iterative calculation of the correlation P(d) is undertaken by means of the following algorithm:

$$P(d) = P(d-1) + (r_d r^*_{d-(N+L)}) - (r_{d-N} r^*_{d-(N+L)-N})$$

And the calculation of the power R(d) by means of the following algorithm:

$$R(d) = R(d-1) + |r_d|^2 - |r_{d-N}|^2$$

where r(d) is the current sample, $r_{d-N}$ is the sample that arrives at the receiver N samples before; N is the number of samples in one of the symbols in the synchronization sequence; $r^*_{d-(N+L)}$ the complex conjugation of the sample received N+L samples previously and $r^*_{d-(B+L)-N}$ the complex conjugation of the samples received 2N+L samples previously, where L is the number of cyclic prefix samples of the OFDM symbol.

Iterative calculation of the correlation consists of adding to the correlation value calculated for the previous sample, the product of the current sample and the complex conjugation of the sample received N+L samples before, and subtract from this result the product of the sample received N samples before and the complex conjugation of the sample received 2N+L samples previously.

In a similar way, the iterative calculation of the power consists of adding the power value calculated for the previous sample to the square of the current sample and subtracting the square of the sample received N samples previously.

The process in this invention uses only the real part of the correlation to simplify calculation, because the real part predominates over the imaginary when frequency error is less than a pre-established threshold.

The process in this invention carries out the detection of the synchronization sequence by comparing the value of the correlation with the power value multiplied by a value C to minimize the probability of synchronization acquisition due to impulse noises and therefore the synchronization sequence and the optimum moment for the sample are detected when the correlation module is greater or equal to the threshold previously mentioned for the power value obtained.

The two identical synchronization symbols are selectively constituted with fixed and /or pseudorandom information, information that is sent in the carriers in these synchronization symbols and which is known on reception.

Both synchronization of the sampling frequency and synchronization in time in the receivers comprise an acquisition stage and a tracking stage, where the acquisition stage comprises a search for a determined number of synchronization sequences, so that once this determined number of sequences is adequate they are validated and a correction of frequency error is carried out before moving on thereafter, to the tracking stage.

The acquisition stage for the time synchronization comprises a waiting stage to detection a synchronization sequence by the receiver and from which the arrival of a further determined number of synchronization sequences is awaited, separated by a determined number of samples, due to the fact that the transmitter is periodically transmitting synchronization sequences; all of which occurs before moving on to the tracking stage to reduce the probability of acquisition of synchronization due to a false alarm.

Following the acquisition of the time synchronization the process comprises a tracking stage for the time synchronization where it continues detecting the synchronization sequences sent by the downstream channel to the users, and which consists of keeping account of the number of sequences not received, where in case a certain established limit is surpassed causes the process to return to the time acquisition stage.

Each time a synchronization sequence arrives at the tracking stage in time synchronization, the process in this invention includes a stage where the moment marking the beginning of the OFDM symbol is modified. This modification is carried out by means of the variation of the group of samples that are applied to the stage when the signals are transformation from the time to the frequency domain, conventionally included in the user receivers, and which may produce a change of phase or rotation in the demodulated constellations that is corrected by means of equalization, for which furthermore, equalization sequences are transmitted preferably after synchronization sequences.

The process in the current invention includes the possibility of suppressing the frequency synchronization stage, if the oscillator, which is used to provide the master frequency in the analog/digital converter of the receiver, is sufficiently precise.

Regarding the frequency synchronization acquisition stage, it is important to mention that this takes place after the time synchronization acquisition stage and includes the estimation of sampling frequency error from the correlation angle in the maximum moment of this metric, using the moment situated in the centre of the flat zone of the maximums of the metric, according to the following algorithm:

$$\langle \gamma(\vartheta_{opt}) \rangle = -2\pi f_c M(N+L)\left(\frac{\Delta f_s}{f_s + \Delta f_s}\right)$$

where M is the interpolation factor of the interpolator device this is usually included in the head-end transmitter and the decimator factor of the decimator device that is usually in the user receivers, $f_c$ the carrier frequency, $f_s$ the sampling frequency and $\Delta f_s$ sampling frequency error; so that the correlation angle is calculated at the optimum moment by means of the arctangent of the ratio of the imaginary part and the real part, so that starting from the previous ratio $\Delta f_s$ taking as the optimum moment the one situated in the middle of the flat zone of the maximums of the metric and repeating these steps iteratively until the estimation of sampling frequency error is less than a certain threshold.

On the other hand, the frequency synchronization tracking stage includes, using a rotor to compensate for the rotation of the constellation in each carrier or continuing correcting frequency error with a corrector element, or using both forms of follow-up simultaneously.

The first of methods of undertaking frequency synchronization follow-up, consists of multiplying the signal received by a rotor which compensates for the rotation of the constellation in each carrier in the frequency domain, the value of the rotor being calculated by means of calculating the speed of the rotation of the constellation in each carrier.

To calculate the speed of the rotation of the constellation in each carrier, the process includes the sending of a grid during transmission in the downstream channel that involves the sending of the symbols in certain carriers with a fixed modulation (preferably one with low signal to noise demodulation needs). The position of the grid carriers may vary, so that following a certain period of time all carriers will have been obliged at some time to use the fixed modulation (that is to say, they will have been obliged to be grid carriers). The users do not know a priori whether they are the destination or not for the modulated information in these carriers.

Starting from the maximum rotation in the carrier with the greatest frequency, the maximum period between two consecutive measurements of the angle in each carrier is fixed, so that the measurement of this angle is achieved without overflows. $N_T$ refers to the maximum number of symbols between two consecutive measurements of the angle in a single determined carrier, so the grid can be distributed over the N carriers of the system so that all the carriers belong to a grid once during $N_T$ symbols and that:

$$\sum_{i=1}^{N_T} N_i = N$$

that is to say that the sum during $N_T$ symbols of the number of carriers belonging to the grid in each symbol is equal to the total number of carriers in the system. In the previous equation $N_i$ is the number of carrier belonging to the grid in the symbol i; so that following $N_T$ symbols a new measure of the speed of the rotation in each one of the carriers is obtained.

The head-end equipment continues using the grid carriers to transmit information (as occurs with all the other carriers), but with the peculiarity that it uses the fixed modulation in these. The users, both those to which the information in the grid carriers is destined for and all the other carriers know the modulation used in these carriers and can recuperate that information, using this reception to estimate the rotation speed of the grid carriers.

The users demodulate the information sent by the grid carriers (due to the fact that they know the modulation used by these, regardless of whether the information is destined for them or not) and estimate the angular deviation by comparing the point of the constellation received with an estimation of the point of the constellation transmitted. Calculating the difference between this angle and that calculated $N_T$ symbols previously (depending on the configuration parameters of the grid) and dividing by the number of symbols between both measurements, an estimation of the rotation speed of the constellation in each carrier where the rotated angles are calculated is obtained.

The second means of undertaking tracking in frequency comprises estimating the frequency error by means of measuring the rotated angle of the constellation of each one of the carriers in one symbol and correcting this error by means of a frequency corrector element where this measure is equivalent to the correlation angles.

The process described allows secure time and frequency synchronization in the transmission of data in the downstream channel over the electricity network.

The following drawings are provided to facilitate a better understanding of the present invention and while forming an integral part of the detailed description and the claims, they offer an illustrative but not limited representation of the principles of this invention.

DESCRIPTION OF A PREFERRED EMBODIMENT OF THE INVENTION

The following is a description of the invention based on the drawings described above and numbered FIGS. 1 to 8.

As stated previously, the invention is applicable to two-way communication over the electricity network between a head-end and various users and has as its objective the provision of a process that makes synchronization possible in a point to multipoint system with orthogonal frequency division multiplexing (OFDM) modulation, such as has been described in Spanish Patent submission No 20003024.

Figure 1:
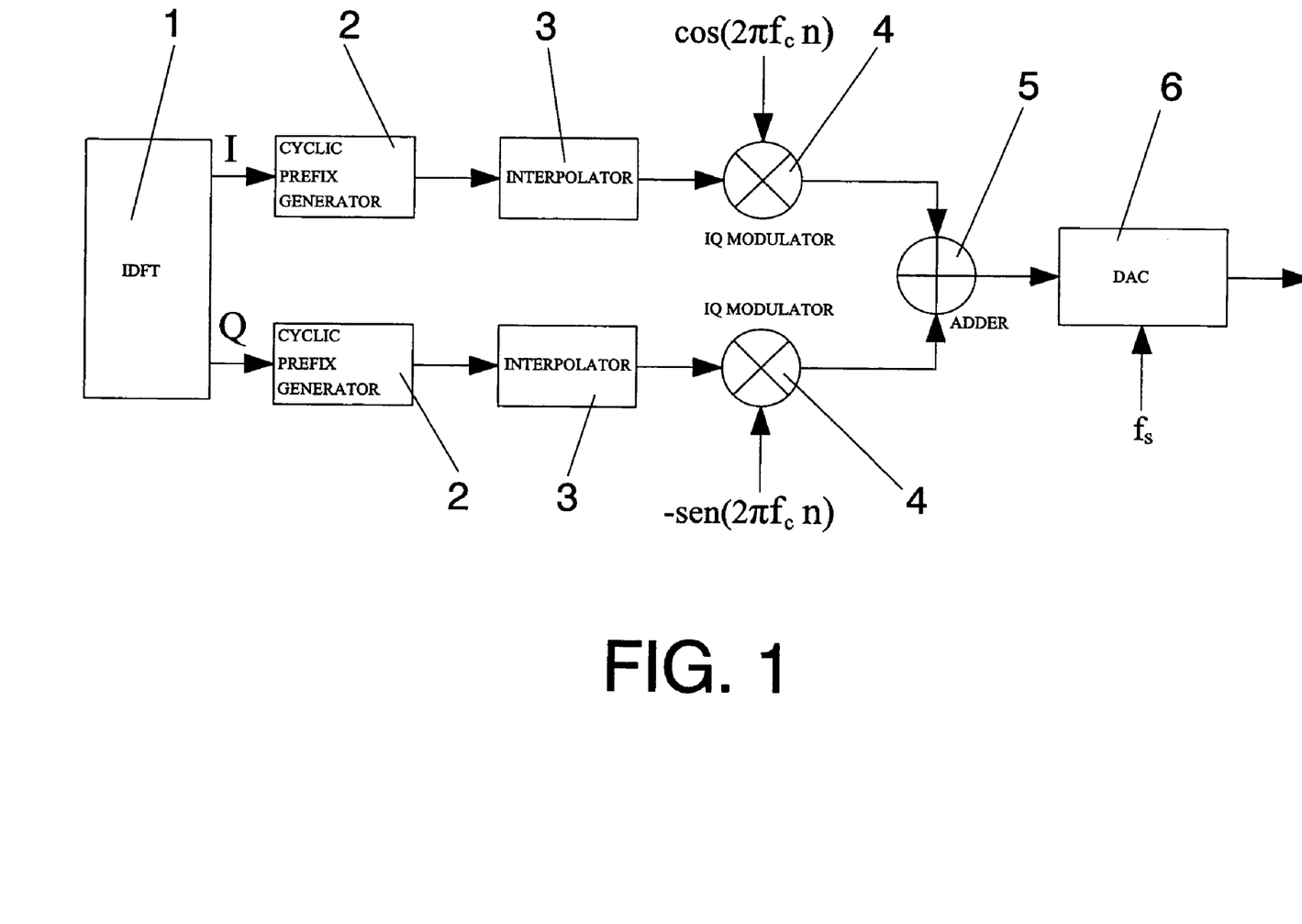
FIG. 1 shows the final part of the functional blocks of the head-end transmitter by which the synchronization sequences and data are sent according to the process described in this invention. The rest of the transmitter is not included as it is not relevant to understanding the invention.

It is well known in the state of the art that the head-end transmitter makes a translation of the signals to be sent from the frequency to the time domain, by means of a module 1 that carriers out the inverse discreet Fourier transform (IDFT). The OFDM (orthogonal frequency division multiplexing) symbols are obtained in baseband, and in the time domain on existing module 1. On exiting the IDFT the signal is separate in phase 1 (for example, the real part of the output) and quadrature Q (the imaginary part), and these are applied to a cyclic prefix generator 2 which adds the cyclic prefix to each OFDM symbol so as to avoid interference between symbols and to absorb possible echoes by the reception of the symbol in multiple channels, such as happens conventionally with this modulation.

Following on from this, the signal is introduced into a modulator IQ 4 (in phase and quadrature) having previously passed through an interpolator 3 with the interpolation factor M.

Figure 2:
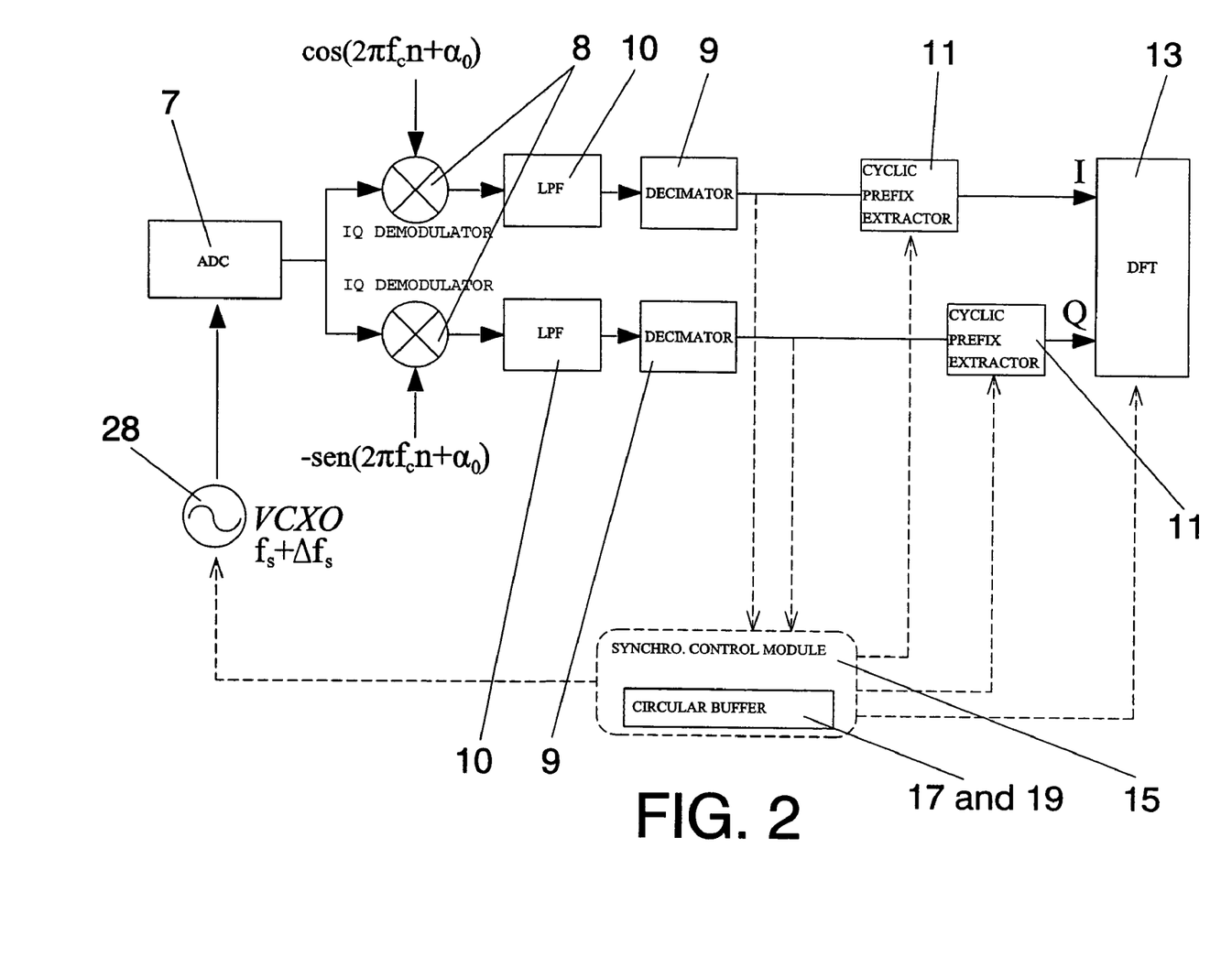
FIG. 2 shows the start of the user receivers that detect the synchronization sequences in the downstream channel to carry out the synchronization of the receivers according to the process in this invention, using a VCXO to carry out frequency correction.

Thereafter the signal modulated in phase and quadrature is applied to an adder 5 whose exit is connected to an analog/digital converter 6 which is connected to certain analog components (separator, amplifiers and filters) that allow the signal to be introduced into the electricity network to be sent to the various users, where receivers will take the signal from the network (by means of the separator and some analog filters) and send the signal to an analog/digital converter 7 connected to a demodulator IQ 8 that delivers the signals in phase and quadrature (I and Q) to a decimator 9 of the order M by means of a low pass filter 10 and following this the signal is delivered to a cyclic prefix extractor 11 by means of a re-sampling filter 12 (in cases where re-sampling is used), thereafter, the signal is translated from the time to the frequency domain by means of module 13 which carries out the discreet Fourier transform (DFT).

In one example an error in the sampling frequency will occur due to the differences existing between the equipment oscillators 28a and 29, depending on the implementation of the equipment, where the sampling frequency $f_s$ in the converter 6 does not exactly correspond to sampling frequency in the converter 7. Mathematically the sampling frequency for the receiver will be $f_s + \Delta f_s$, where $\Delta f_s$ is the frequency variation caused by the difference, already mentioned, between the oscillators of the various equipments.

The error in sampling frequency causes the constellation in each of the carriers in the modulation to rotate symbol to symbol. As well as this problem, errors in sampling frequency may at the same time provoke attenuation and noise in the system, therefore, it will be necessary to correct these errors by means of synchronization in the receivers so that the sampling frequency in the user converters 7 will be equal to that of the converter 6.

Furthermore, in a specific example a phase error αo also exists in the senusoidals used to carry out the demodulation IQ in the demodulators 8. In this case, the error in phase produces a constant rotation in the constellation of each carrier and as a consequence may be corrected by an equalizer, while no specific correction of this error at the synchronization level will be necessary.

A further problem also exists in that the receivers do not know exactly what the starting sample of an OFDM symbol is, which is a serious problem in that without this information it is not possible to know exactly the number of samples belonging to a cyclic prefix and the number that should be introduced in block 13 that carries out the translation from time domain to frequency domain. If the samples introduced in the DFT 13 contain samples from various different symbols, significant degradation is produced in the signal to noise ratio for the system which in turn generates interference between the carriers and the symbols and for which it is necessary that the user receivers know to which symbol each sample corresponds.

Therefore it is necessary to synchronize the user receivers in both time and frequency, so that synchronization sequences are sent from the transmitter and are captured by a synchronization control module 15, that estimates the error in the sampling frequency and the moment of the start of the OFDM symbols from the samples obtained at the exit of the decimator 9, all of which occurs according to the process described hereafter.

Figure 5:
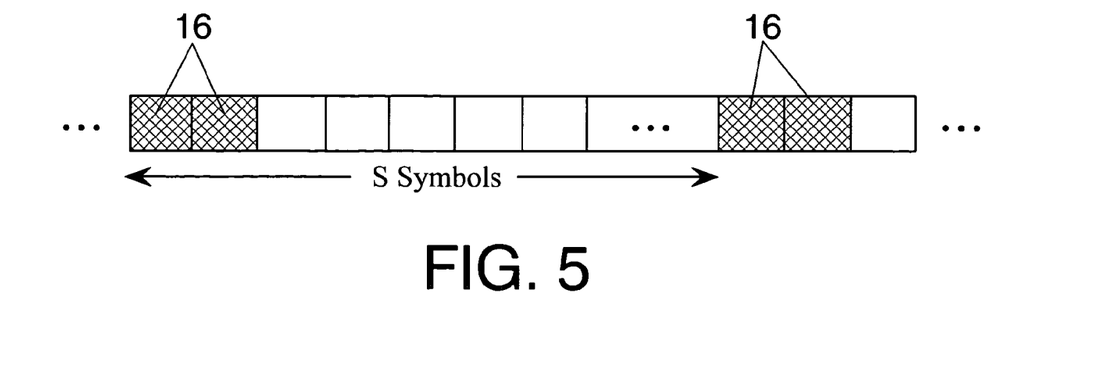
FIG. 5 shows examples of the synchronization sequence sent in the downstream channel that is composed of two identical OFDM symbols and which are periodically sent every S symbols in the downstream channel.

The process of this invention comprises the generation of the synchronization sequences by means of two identical synchronization symbols 16 that are periodically transmitted by the head-end to the user receivers. The two identical synchronization symbols are used to simultaneously estimate sampling frequency error and the start of each symbol in reception.

The information transmitted by the carriers, used in both synchronization symbols, may be a fixed or a pseudorandom sequence, but it must always be the same in both symbols and must be known by each receiver.

To carry out synchronization in the receivers it is necessary in the first place to detect the synchronization sequence and for which the synchronization control module 15 applies the maximum likelihood criteria to the samples obtained at the exit to the decimator 9. This criterion is known in the state of the art for other applications and is defined by the following algorithm:

$$\Lambda(\theta,\epsilon) = |\gamma(\theta)|\cos(2\pi\epsilon + <\gamma(\theta)) - \rho\xi(\theta)$$

Where θ is the moment of the sample, $\epsilon = \Delta f^*(T_s + T_{cp})$ (where $T_s$ is time of transmission and reception of a symbol and $T_{cp}$ the time of the cyclic prefix) the difference between the transmission and reception oscillators multiplied by the time difference between the two intervals that are correlated to find similarities and, $$\rho = \frac{\sigma_s^2}{\sigma_s^2 + \sigma_n^2} = \frac{SNR}{SNR+1} \cong 1$$

$$\gamma(m) = \sum_{k=m}^{m+l-1} r(k)r*(k+n)$$

$$\xi(m) = \frac{1}{2}\sum_{k=m}^{m+l-1}(|r(k)|^2 + |r(k+n)|^2) \cong \sum_{k=m}^{m+l-1}|r(k)|^2$$

Where 1 is the number of samples of the intervals whose similarity we are looking for, and n is the number of samples that are found in phase out. In this case 1=N and n=N+L where N is the number of samples of one of the symbols of the synchronization sequence, and L the number of cyclic prefix samples. Therefore γ is the correlation of the two intervals of N samples separated N+L and ξ the power of N samples.

The maximum likelihood criteria is at maximum when the cosine and the correlation module (γ) are at maximum.

For time synchronization the correlation maximum (γ) is used. By this means it is possible to obtain the optimum moment: $\theta_{opt}$.

In frequency synchronization the cosine is maximum when:

$$\hat{\varepsilon}(\theta_{opt}) = -\frac{1}{2}\angle\gamma(\theta_{opt}) + n$$

Where ε is an estimate of frequency offset on translating the signal in band, that is, a frequency error equal for all tones (carriers) in the signal. Taking n=0 in the previous equation the result is that $\Delta f_s < 1/(T_s + T_{cp})$, and substituting ε for its value, we obtain:

$$\angle\gamma(\theta_{opt}) = -2\pi\Delta f(T_s + T_{cp})$$

This development presupposes a translation to analog band and therefore displacement is equal in all carriers. This type of error does not exist in this invention due to the fact that the analog signal is not translated in band. Notwithstanding this sampling, frequency error exists, which gives rise to displacement in frequency that is different in each and every one of the tones (carriers) in the signal. However, due to the fact that this displacement is of the same sign in all tones (carriers), ε is proportional to the measure of this error, and can serve as the estimator. In this case, the correlation angle is equivalent to:

$$\angle\gamma(\theta_{opt}) = -2\pi f_c M(N+L)\left(\frac{\Delta f_s}{f_s + \Delta f_s}\right) \quad (A)$$

where M is the interpolation and decimator factor used before and after the converters in transmission and reception, respectively, and $f_c$ the frequency of the digital carrier.

Frequency error $\Delta f_s$ may be easily clearer from the previous equation once all the other factors of the equation are known.

Figure 4:
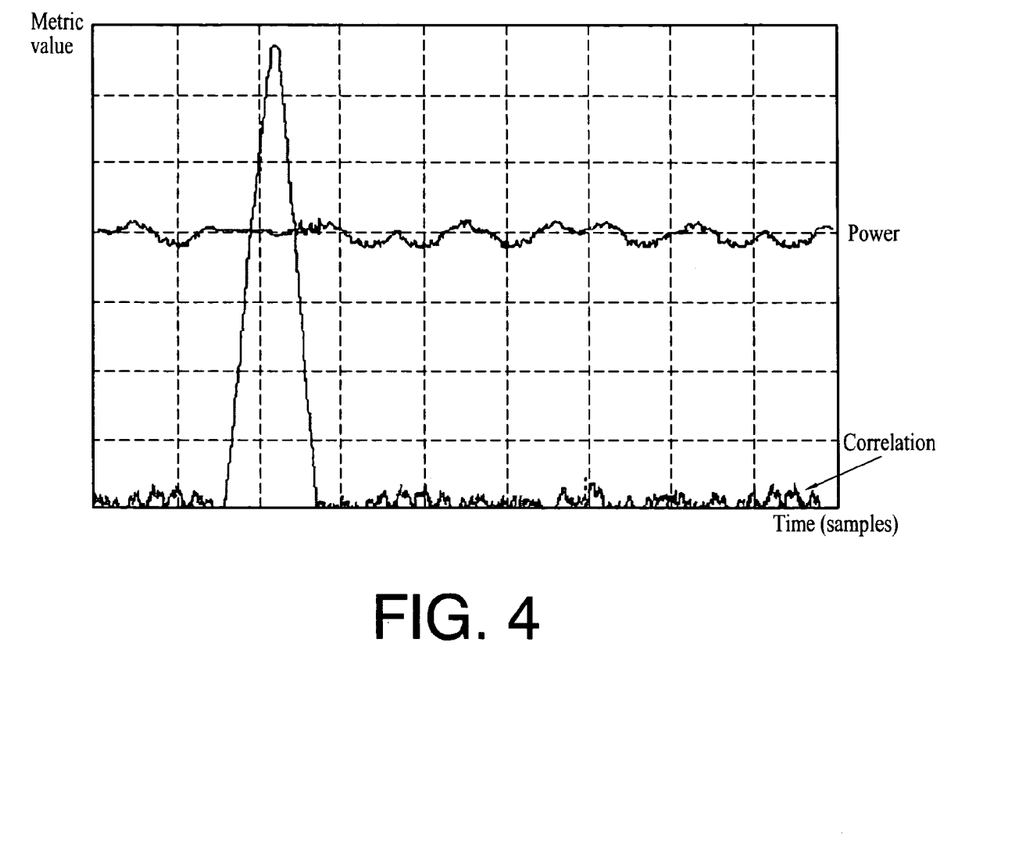
FIG. 4 shows a graphic representation of a typical example of the correlation and the power multiplied by a threshold of the samples obtained in the receivers. This figure clearly shows that the correlation maximum is maintained in the receiver during various samples.

Synchronization sequences composed of two identical synchronization symbols 16 are separated at a fixed time quantity to increase robustness and to reduce the probability of synchronization detection due to impulse noise, so that the receiver may begin its synchronization at any moment starting from this sequence. FIG. 4 shows an example where the periodic sending of two synchronization symbols 16 are sent every "S" symbols.

Figure 3:
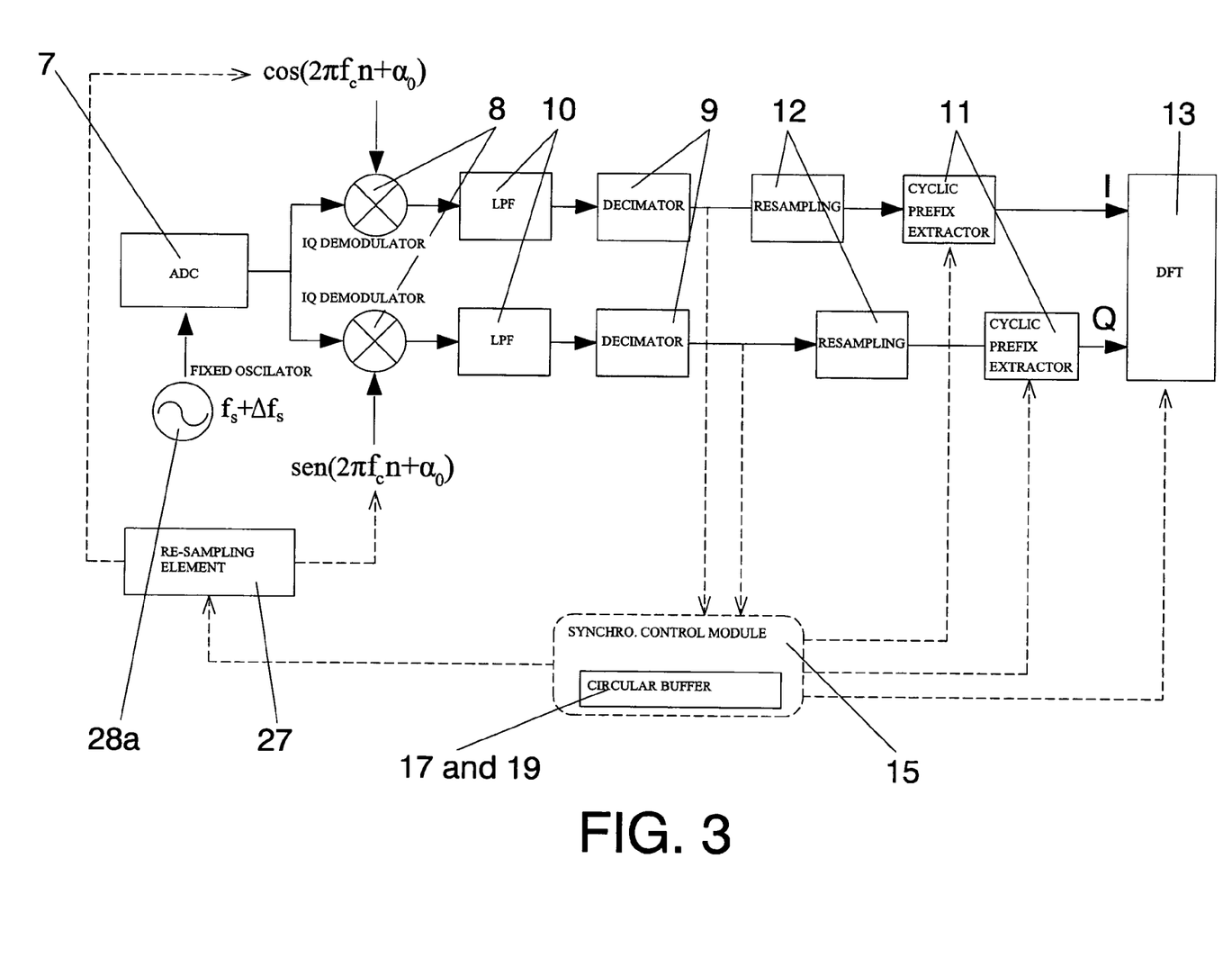
FIG. 3 shows another possible example of carrying out the synchronization of the receivers according to the process of the invention using a re-sampling element along with filters to carry out frequency correction.

To detect synchronization sequence, this invention uses the metric previously mentioned and where in the optimum moment the correlation (value of γ) and power (value of ξ) have the same value, and in consequence signal power is used as a threshold to determine the correlation maximum. Maximum correlation is searched for when the condition |γ|>C.ξ is given. The threshold C is fixed seeking to minimize the probability of detecting synchronizations due to impulse noises. With the pair of equal synchronization symbols 16, the correlation theoretically does not have a single maximum, rather it concerns a peak with a plateau, as shown in FIG. 3. This plateau is as wide as the samples without intersymbol interference (ISI) that are in the cyclic prefix. Any one of these samples can be taken as the end of the synchronization symbol because taking any other one will only have the effect of causing a phase out that will be equal for all the symbols at the output of the DFT 13. This phase out is easily corrected by the equalizer and does not cause degradation in reception.

The central sample in the plateau is taken as the optimum time synchronization point and is used to detect the peaks.

Figure 6:
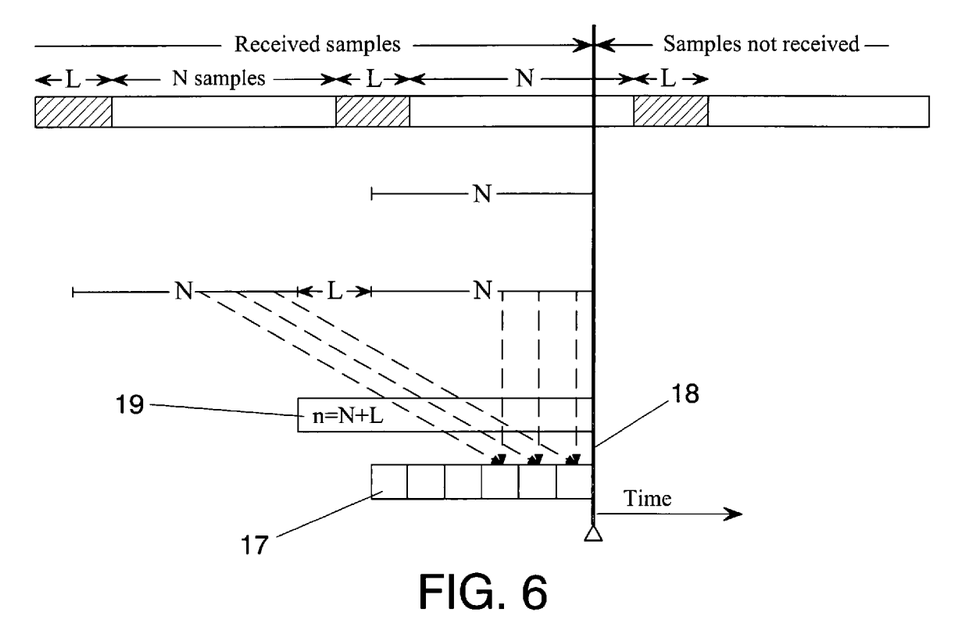
FIG. 6 shows the form in which the calculation of the correlation and the power is carried out starting from the samples that arrive at the receiver by means of circular buffers.

The correlation is calculated iteratively and for which the synchronization control module 15 contains a circular buffer 17 of N length in which the product of the current sample by the conjugated sample that arrived N+L samples before is stored, where the current moment is represented in FIG. 6 by the vertical line 18. This value is added to the current value of the correlation and what comes out of the buffer is subtracted from this so that in the correlation the sum of all the memory positions is obtained. As well as the buffer 17, it will also be necessary to store the samples in the buffer 18 of length n=N+L, so as to undertake the product mentioned previously.

The following algorithm represents this mathematically:

$$P(d) = P(d-1) + (r_d r^*_{d-(N+L)}) - (r_{d-N} r^*_{d-(N+L)-N}) \text{ for the correlation,}$$

where P(d) is the correlation, $r_d$ the current sample, $r_{d-N}$ the sample that arrived at the receiver N samples before and $r^*_{d-(N+L)}$ the complex conjugation of the sample that arrived at the receiver N+L samples before, and, $r^*_{d-(N+L)-N}$ the complex conjugation of the samples that arrived at the receiver 2N+L samples before.

Calculation of power may also be carried out iteratively by following a similar process to that for the correlation. In this case the algorithm used will be:

$$R(d) = R(d-1) + |r_d|^2 - |r_{d-N}|^2 \text{ for power;}$$

Where R(d) is power, $r_d$ the current sample, and $r_{d-N}$ the samples that arrived at the receiver N samples before.

Figure 7:
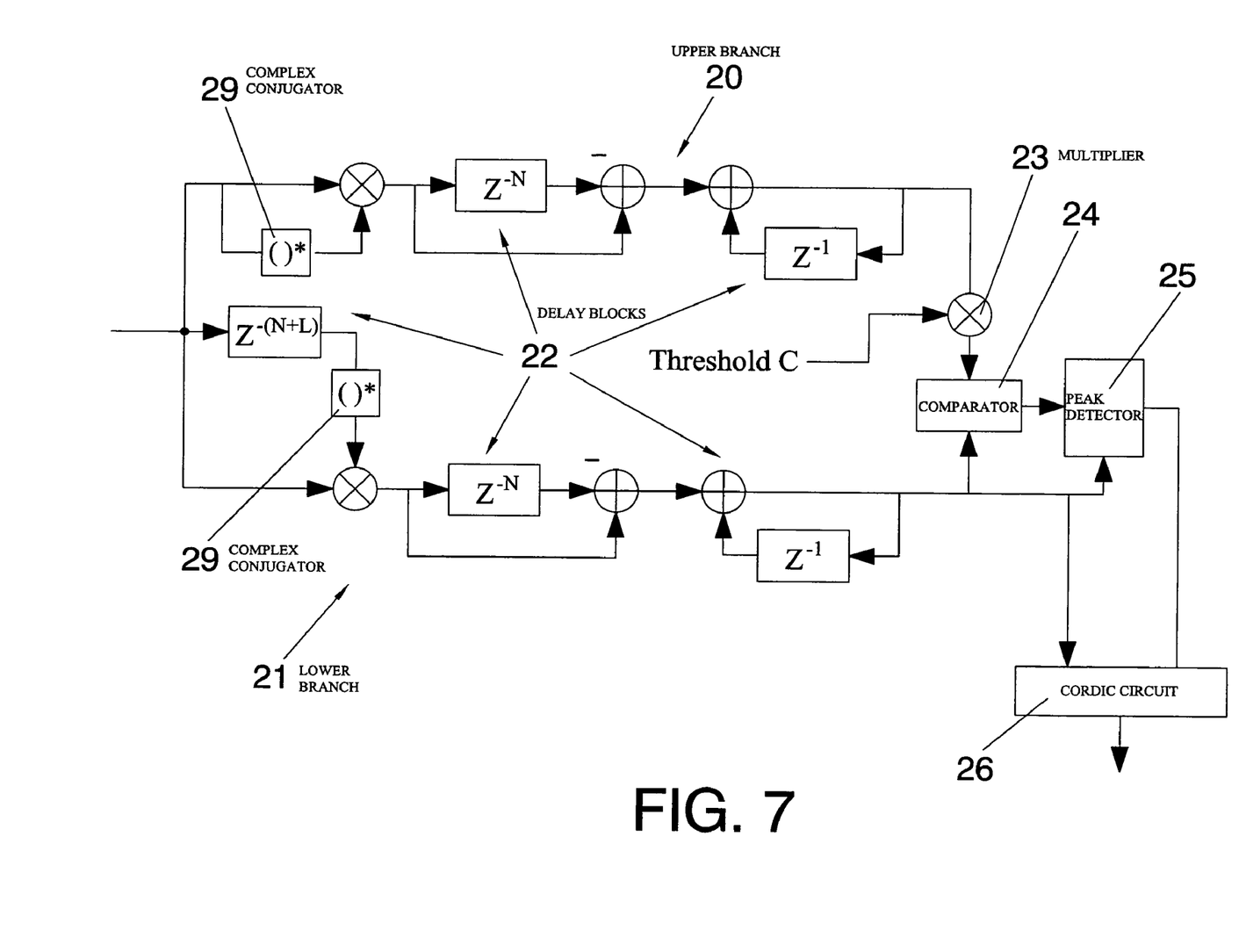
FIG. 7 shows a block diagram of a possible example, according to this invention, in which the calculation of the power and the correlation is undertaken starting from the samples that arrive in that moment in the receiver.

FIG. 7 shows a possible implementation of these calculations where by means of the upper branch 20, power is calculated using the previous algorithm and in the lower branch 21 correlation is calculated using the algorithm already mentioned. In both branches 20 and 21, delay blocks 22 are used and correspond to $Z^{-N}$, $Z^{-1}$, $Z^{-(N+L)}$, which delay the output of the number of samples that show their exponent so as to obtain the iterative formulas already mentioned.

The power thus calculated is multiplied by the threshold C in the multiplier 23 and the result goes to a comparator 24 which compares this result with the value of the correlation obtained, so that by means of a peak detector 25 the synchronization peaks shown in FIG. 3 are detected, and starting from detected peak correlation, one proceeds to calculate the angle of the metric using the arctangent, preferably by means of a CORDIC circuit 26.

Therefore, to carry out the acquisition of time synchronization, the receiver initially waits to detect a synchronization sequence according to the process already discussed and once detected it awaits the arrival of another synchronization sequence a determined number of symbols later S.

In case that the other synchronization sequence does not arrive, the synchronization process returns to the initial state.

On the contrary, when the first two-synchronization sequences have been correctly detected the arrival of another synchronization sequence is awaited and like this a certain number of successive synchronization sequences are detected, and at this moments it is assumed that the synchronization sequences detected are in fact real. If during some sample interval when a synchronization sequence that is expect fails to be detected, the initial state is again resumed. If a sequence of synchronization symbols is detected outside the interval expected, it is ignored.

Regarding the stage of synchronization acquisition in frequency, the possibility exists of including a high quality oscillator in the receivers to provide the sampling frequency, in which case the frequency acquisition stage is not necessary. In this case, to calculate the metrics to be maximized only the real part of the correlation is used, due to the fact that the imaginary part is practically zero and therefore it is not necessary to calculate it.

On the contrary, if the oscillator that produces the sampling frequency is not very precise and once time synchronization has been acquired, the error produced in frequency is estimated with each synchronization sequence and corrected by means of the frequency corrector element that is a VCXO 28, which in one embodiment of the invention may be used as an oscillator in reception instead of the fixed oscillator like 28a, or by means of a re-sampling element 27 and resample filters 12, that are explained later on. To estimate the frequency error the correlation angle is calculated preferably by means of CORDIC 26 or a similar circuit mentioned previously that carries out the arc tangent of the ratio of the imaginary and real parts of the correlation. Once the correlation angle is known, $\Delta f_s$ is calculated finding it (A) from the equation, as has been commented previously.

Starting from the calculation of the frequency error an iterative frequency correction and error estimation process is begun until the estimation is less than a predefined threshold.

In one example of implementation, the correction of sampling frequency in the analog/digital converter 7 is undertaken by means of an oscillator controlled by voltage 28 that is governed by the synchronization control module 15 beginning from the calculations undertaken so as to reach adequate sampling frequency.

There also exists the possibility that the frequency corrector element be composed of a re-sampler 27 that is applied to the IQ demodulator 8. In this case re-sampler filters 12 are necessary to adapt the re-sampled signal before taking out the cyclic prefix. These filters are not necessary if another method of rough error correction in frequency is applied, as in the case of using a VCXO 28 that is a voltage controlled oscillator to generate sampling frequency in reception.

The time synchronization tracking stage corresponds to the stage in which head-end transmitter is functioning normally that is, transmitting data. Due to the fact that in the tracking stage where the synchronization sequences are received is known, if it is detected that one is missing, a counter that counts the synchronization sequences missing, is increased. When this counter arrives at a limited number the acquisition stage is carried out again.

When the synchronization sequence arrives, the count of which samples should enter module 13 is modified, and for which the synchronization control module 15 acts on the cyclic prefix extractor module 11 and on the module 13, to allow the selected samples to enter. Having changed the moment in which the symbol begins it is necessary to equalize again by means of the equalizer because the phase out changes when we change the start of the symbol to different sample of the cyclic prefix. For this, a series of equalization symbols are included after the synchronization sequence and are used in the equalizer to carry out the equalization mentioned.

It must be stated regarding the frequency synchronization tracking stage that although a frequency corrector element exists, there is always a residual error in the sampling frequency that produces a rotation in the position of the points of the constellation on demodulating it in reception. This error is cumulative which is to say that if following a symbol the rotated angle of a specific carrier is 0.3°, following 10 symbols the rotated angle will be 3°.

Figure 8:
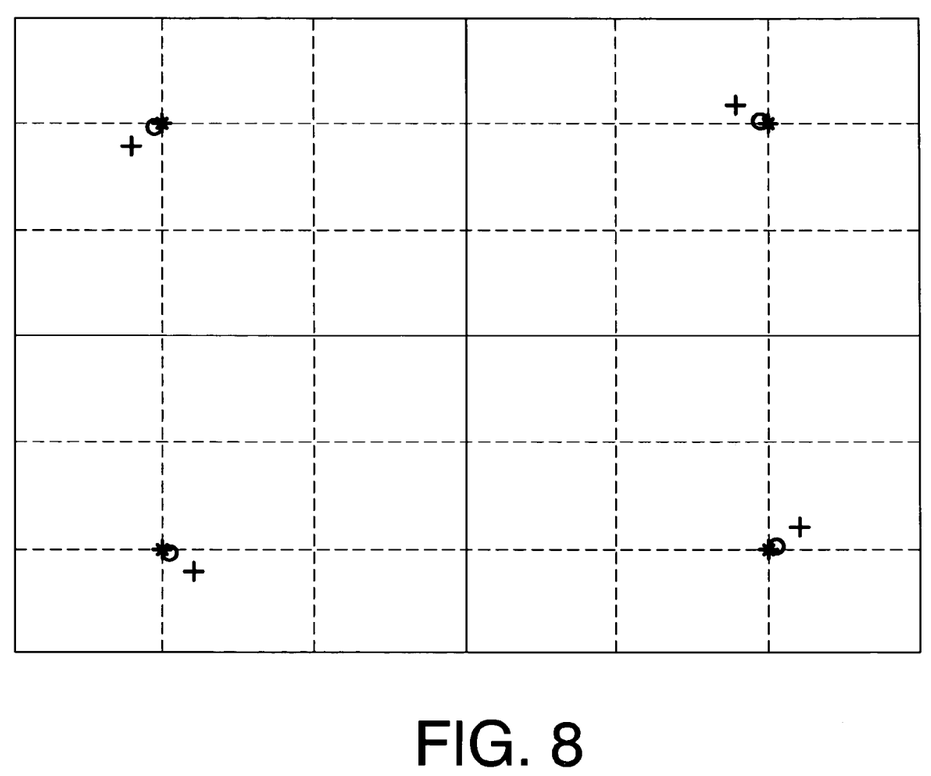
FIG. 8 shows a graphic of the rotation of the constellation QPSK that is produced in reception due to the difference in samples between the beginning of the symbol and the sample taken at this moment by the receiver.

FIG. 8 shows the position of the sample without error marked by a star, the point of the constellation (rotated) following ten symbols marked with a circle and following 50 symbols marked by a cross.

If the residual error is not corrected the moment will arrive when the points of the constellation will pass to the next quadrant and will be erroneously interpreted in reception as a point send in another quadrant.

To follow and correct the residual error, a rotor is used in the frequency domain where it is included in the equalization module. Additionally, using the rotor sampling frequency error may be estimated and this estimation may be used as an entrance to the frequency corrector element, regardless of whether this is a re-sampler 27 with its filters or a VCXO 28. The estimation carried out by the rotor is more precise than that obtained by the arc tangent, as can be appreciated from the previous points.

To use the rotor, the rotation speed of the constellation for each carrier in the frequency domain must be calculated and thereafter this rotation is compensated for in each symbol received.

The variation of the response in frequency for the electricity network is not significant during the time of twenty symbols (thanks to the time symbol selected in the design of the system), so that is can be assumed that during a certain time the rotation produced in the carriers is due only to the residual error in the sampling frequency estimation, and not due to changes in the channel response. It is for this reason that according to one embodiment of the invention, it has been assumed that in sixteen symbols the effect of the channel on the rotated angle is negligible in face of the rotated angle due to the sampling frequency error.

With this approximation, it can be shown that the phase rotation of the carrier k-esima from symbol to symbol due to sampling frequency error can be defined as:

$$Rotation_k = \begin{array}{l} -2\pi\dfrac{\Delta f_s}{f_s + \Delta f_s}\left(\dfrac{k}{N} + f_c M\right)(N+L),\ 0 \le k \langle \dfrac{N}{2} \\ -2\pi\dfrac{\Delta f_s}{f_s + \Delta f_s}\left(\dfrac{k}{N} - 1 + f_c M\right)(N+L),\ \dfrac{N}{2} \le k \langle N \end{array}$$

Where $f_s$ the is nominal sampling frequency, $\Delta f_s$ the error in sampling frequency, N the number of samples in the symbol, $f_c$ the frequency used for the IQ modulation, M the decimator factor in the decimators 9 and L the number of samples of the cyclic prefix.

To correct the rotation caused by the residual error in frequency the received signal must be multiplied by a complex exponential with the opposite angle to the rotor estimation.

To calculate the speed of rotation of the constellation in each carrier, the process comprises transmission of a "grid", in the downstream channel, which consists of sending certain carriers in the symbol following the synchronization sequences with a fixed modulation (preferably one with low signal to noise requirements for its demodulation). The position of the grid carriers may be modified so that following a certain period of time all carriers will have been obliged at one time or another to use the fixed modulation (that is to say they will have been obliged to be grid carriers). The users, regardless of whether or not the information is destined for them, do not know the information sent by the carriers.

With the maximum rotation produced in each carrier with greater frequency fixed by system design and the value of $\Delta f_g$ as the error in sampling frequency fixed due to the difference between the transmission and reception oscillators in the various equipments, the maximum period between two consecutive measures of the rotated angle in each carrier is fixed so that an estimation of the rotation speed in each carrier without producing overlappings or overflows can be made, when the difference in phase between two consecutive rotated angles in the same carrier is less than 180° ($\pi$ radians) Mathematically this period may be calculated as:

$$(\theta_2 - \theta_1) < \pi$$

$$\theta_1 = 2\pi f_{\text{max\_error}} \tau_1$$

$$\theta_2 = 2\pi f_{\text{max\_error}} (\tau_1 + T)$$

So that: $T_{\max} < \dfrac{1}{2 f_{\text{max\_error}}}$

The value $f_{max\_error}$ may be obtained starting from the formula for the rotated angle of the carrier k-esima from symbol to symbol, so that:

$$f_{\text{max\_error}} = \frac{\Delta f_s}{f_s + \Delta f_s} \left( \frac{P_{\text{max\_error}}}{N} + fcM \right)$$

where $P_{max\_error}$ is the index corresponding to the highest carrier, $f_s$ is the nominal sampling frequency in the oscillators of the various equipments, $\Delta f_s$ is the sampling frequency variation, N the number of symbol samples, $f_c$ the carrier frequency, and M the decimator factor.

Taking the entire value of the division of this maximum period between two consecutive rotated angles in the different carriers and the symbol period, one obtains:

$$N_T = \left\lfloor \frac{T_{\max}}{T_{symbol}} \right\rfloor$$

Where $N_T$ represents the maximum number of symbols between two consecutive measures of the angle in a given carrier, so that the grid may be distributed over the N carriers in the system requiring that the number of grid carriers per symbol multiplied by the number of symbols with grid in one measurement period (whose value is less or equal to $N_T$) must be equal to the number of carriers in the system, N.

Two possible implementations in the distribution of the grid consist in forcing all carriers to be grid carriers in a symbol or distributing them in the symbol period to a maximum of $N/N_T$ carriers, with the objective being that in a maximum $N_T$ symbols the measure of the rotated angle has been undertaken in all carriers and for which following $N_t$ symbols a new measurement process is undertaken.

The head-end equipment continues to use the carriers that are being used as grid to transmit the information desired (as happens in all other carriers), but with the peculiarity that it is obliged to use the fixed modulation in them. The users, both those to whom the information in the grid carriers is destined as well as those to whom it is not, know the modulation used in the carriers and may recuperate the information, using this reception to carry out an estimation of the speed of the rotation in the grid carriers.

The user equipments demodulate the information sent by the grid carriers (due to the fact that they know the modulation used in these, whether or not the information is destined for them) and estimate the angular deviation by comparing the point of the constellation received with the point of the constellation that should have been sent. Calculating the difference between this angle and the angle calculated a number of symbols earlier (depending on the configuration parameters of the grid) and dividing by the number of symbols between both measurements, an estimation of the rotation speed of the constellation in the carriers where the rotated angles have been calculated is obtained.

An example of this implementation may assume that the period is 16 symbols, so that every 16 symbols all the carriers will have been used as grid carriers at some time: if, for example, there are 32 carriers in total, one form of grid would be to place two carriers as grid and to continue modifying the position symbol by symbol. In this case the head-end will continue using these carriers to send information, but it will be modulated with the modulation with low signal to noise demodulation requirements (for example QPSK), and the users demodulate the information (regardless of whether they are the destination or not for the information, due to the fact that they know it is sent in QPSK). Once the period ends, that is, following 16 symbols a new measurement of the value of the rotated angle for all carriers is taken and therefore a new estimation of the rotation speed in each carrier. In this case, to calculate rotation speed in the carriers, the QPSK symbols sent in this carrier are firstly demodulated. The angle formed by the point of the constellation received and the coordinate axis is subtracted from the angle of the point of the constellation sent, so that the angular deviation produced in this carrier is known. A new angle is calculated for this carrier every 16 symbols so that the difference in the angle recently calculated and that calculated 16 symbols earlier are divided by 16 to know the rotation speed per symbol. This estimation, along with those made earlier, may be sent to a low pass filter to eliminate variations due to sudden channel changes and to reduce the effect of noise on the estimation. To accelerate the convergence process frequency averages of the results for various carriers may be carried out.

Correction by means of the rotor consists of multiplying the signal by a complex exponential in the frequency domain, that is to say on exiting module 13, and specifically in the equalizer. To simplify, and due to the fact that the error in this stage is a small one, we may bring the real part of the complex exponential closer to 1 and the imaginary part to the angle estimated in the radians.

The result of calculating the average of these rotations in all carriers is:

$$-2\pi f_c M (N + \Delta) \frac{\Delta f_s}{f_s + \Delta f_s}$$

This average value is an estimation of the frequency error that may be used to precisely correct this error in frequency. For this, the estimation is used as an entrance to the frequency corrector element, whether this be the re-sampler 27 with it resample filters 12 or the VCXO 28, to achieve greater precision. In another embodiment of the invention, the estimate starting from the correlation angle obtained for the arc tangent by means of an adequate circuit to calculate said arc tangent, preferably CORDIC 26, such as mentioned earlier, can be used at this stage.

The invention claimed is:

1. A process for synchronization in the downstream of multiple users in a point to multipoint system with OFDM modulation, applicable to two-way communication over the electricity network between a head-end and various user equipments that includes the means to add and extract a cyclic prefix to the OFDM symbols, including interpolators and decimators in the transmission and reception systems of the equipments and digital band translation, and which comprises the sending of synchronization sequences in the information that is sent via the downstream channel which runs from the head-end to the user equipments, to provide synchronization in frequency and time in reception, and wherein the process comprises:

generating synchronization sequences by means of two identical synchronization symbols;

transmitting periodically said sequences from the head-end equipment by the downstream channel to all the user equipments;

detecting said synchronization sequences in reception by the user equipments;

estimating the beginning of the OFDM symbol in order to synchronize in time by using maximum likelihood criteria so that time synchronization begins from the calculation of the maximum correlation of the samples of two received symbols, and this maximum becomes the mid point in the flat zone for the correlation peak, whose size in number of samples is equal to the number of samples of the cyclic prefix without intersymbol interference, ISI; and simultaneously estimating the sampling frequency error and caring out the frequency synchonization, by means of calculating the angle of this correction in the moment determined as maximum correlation, and selectively performing at least one of the following steps in order to synchronize in frequency;

correcting the sampling frequency in the analog/digital converters that are included in the receptors in the user equipments; or re-sampling the digital signal.

2. The process for synchronization in the downstream of multiple users in a point to multipoint system with OFDM modulation, according to claim 1 wherein the correlation maximum is calculated by detecting the correlation peaks that surpass a threshold that corresponds to multiplying the power by a constant C, where the value of this maximum is taken to be the mid point of the flat zone in the correlation peak whose size in number of samples is equal to the number of samples of the cyclic prefix without intersymbol interference, ISI; where the value of the constant C is fixed to minimize the probability of producing false alarms, and the correlation is calculated by means of the following algorithm:

$$\gamma(m) = \sum_{k=m}^{m+l-1} r(k) r^*(k+n)$$

and the power is calculated by means of the following algorithm:

$$\xi(m) = \frac{1}{2} \sum_{k=m}^{m+l-1} (|r(k)|^2 + |r(k+n)|^2) \cong \sum_{k=m}^{m+l-1} |r(k)|^2$$

where $\gamma(m)$ is the correlation at the moment of the sample m and $\xi(m)$ the power at the moment of the sample m, $r(k)$ is the sample received in the moment k, $r^*(k+n)$ is the conjugation of the sample received in k+n, n=N+L and l=n, where N is the number of samples of one of the symbols in the synchronization sequence and L the number of cyclic prefix samples.

3. The process for synchronization in the downstream of multiple users in a point to multipoint system with OFDM modulation, according to claim 2, wherein the calculation of correlation and power is undertaken iteratively, storing the samples and preferably the partial products of the current sample by the conjugated sample that arrived N+L samples before, for the calculation of the correlation and the power by means of the following algorithms:

$$P(d) = P(d-1) + (r_d r^*_{d-(N+L)}) - (r_{d-N} r^*_{d-(N+L)-N})$$

$$R(d) = R(d-1) + |r_d|^2 - |r_{d-N}|^2$$

where $P(d)$ is the correlation, $R(d)$ the power, $r_d$ the current sample, $r_{d-N}$ the sample that arrived at the receiver N samples before, $r^*_{d-(N+L)}$ the complex conjugation of the sample received N+L samples previously and $r^*_{d-(N+L)-N}$ the complex conjugation of the samples received 2N+L samples previously.

4. The process for synchronization in the downstream of multiple users in a point to multipoint system with OFDM modulation, according to claim 2, wherein once frequency error is less that a pre established threshold, only the real part of the correlation is used to simplify calculation.

5. The process for synchronization in the downstream of multiple users in a point to multipoint system with OFDM modulation, according to claim 2, wherein detection of the synchronization sequence is carried out by comparing the value of the correlation with the power value multiplied by a value C to minimize the probability of a false alarm, so that synchronization sequence and the optimum moment for the sample are searched for when the condition $|\gamma| > C\xi$ is given, where C is a factor that multiplies the power so that this product may be used as a threshold.

6. The process for synchronization in the downstream of multiple users in a point to multipoint system with OFDM modulation, according to claim 1, wherein synchronization of the sampling frequency comprises an acquisition stage and a tracking stage, where said acquisition stage includes the estimation of sampling frequency error beginning from the correlation angle in the maximum moment of this metric, using the moment situated in the centre of the flat zone of the maximums of the metric, according to the following algorithm:

$$\angle \gamma(\theta_{opt}) = -2\pi f_c M(N+L) \left( \frac{\Delta f_s}{f_s + \Delta f_s} \right)$$

where M is the interpolation and decimator factor, $f_c$ the carrier frequency, $f_s$ the sampling frequency and $\Delta f_s$ the sampling frequency error; it further comprises a compensation stage for this error by means of a frequency corrector element, selectively consisting of an oscillator controlled by voltage or a re sampler with its associated filters (12), and beginning from the previous algorithm it calculates the angles of the correlation in the moment in which this metric is maximum, for which it calculates the arctangent of the ratio of the imaginary part and the real part of the correlation and obtaining $\Delta f_s$ by the algorithm mentioned previously, these steps being repeated iteratively until the estimation of sampling frequency error is less than a certain threshold.

7. The process for synchronization in the downstream of multiple users in a point to multipoint system with OFDM modulation, according to claim 6, wherein synchronization of the sampling frequency comprises an acquisition stage and a tracking stage, where the frequency tracking stage consists of multiplying the received signal by a rotor which compensates the rotation of the constellation in each carrier in the frequency domain, for which the speed of the rotation of the constellation is calculated in each carrier received.

8. The process for synchronization in the downstream of multiple users in a point to multipoint system with OFDM modulation, according to claim 7, wherein to calculate the speed of the rotation of the constellation of each carrier in reception, a grid is periodically sent during transmission in the downstream channel which obliges the head-end to use a fixed modulation, preferably a modulation with low signal to noise demodulation needs, in some carriers known as grid carriers whose position varies in time when these carriers are used to transmit information; so that the users know the position of the grid carriers and can undertake the process of line quality monitoring in these carriers knowing the modulation used by these, whether the user is the destination of the information sent by these grid carriers or not; with the characteristic that the users do not know a priori if they are the destination or not for the information modulated in these carriers.

9. The process for synchronization in the downstream of multiple users in a point to multipoint system with OFDM modulation, according to claim 8, wherein the maximum period for the grid is fixed beginning from the maximum rotation in the carrier with the greatest frequency, so as not to produce overflows, so that $N_T$ is the period of the grid in symbols, that is, the maximum number of symbols between two consecutive measurements of the angle in a determined carrier, and the grid is distributed over the N carriers in the system requiring that all the carriers belong to the grid once during $N_T$ symbols and that:

$$\sum_{i}^{N_T} N_i = N$$

where the sum of the number of carriers belonging to the grid during $N_T$ symbols is equal to the total number of carriers in the system, where $N_i$ is the number of carriers belonging to the grid in the symbol i; so that following $N_T$ symbols a new measure of the speed of the rotation in each one of the carriers is obtained.

10. The process for synchronization in the downstream of multiple users in a point to multipoint system with OFDM modulation, according to claim 8, wherein to calculate the speed of the rotation in reception the user demodulates the information sent by the grid carriers knowing a priori the modulation used by these, whether or not the user is the destination of the information being sent by the head-end, and calculates the rotation angles regarding the constellation transmitted, so that comparing these angles with the previous calculation for the same carriers and dividing by the time between both angle estimates, the rotation speed for these carriers is calculated.

11. The process for synchronization in the downstream of multiple users in a point to multipoint system with OFDM modulation, according to claim 8, wherein in the tracking stage, frequency error is estimated by measuring the mean value of the rotated angle of the constellation of each one of the carriers in one symbol and this error is corrected by a frequency corrector element, where this mean value is equivalent to the correlation angle.

* * * * *